United States Patent
Tung et al.

[11] Patent Number: 6,080,824
[45] Date of Patent: Jun. 27, 2000

[54] COMPOSITIONS OF POLYCONDENSED BRANCHED POLYESTER POLYMERS AND AROMATIC POLYCARBONATES, AND THE CLOSED CELL POLYMER FOAMS MADE THEREFROM

[75] Inventors: Deborah Ann Snell Tung, Tallmadge; Kevin Rollick, Munroe Falls; John Michael Scoarste, Medina; Walter Francis Johnston, Tallmadge, all of Ohio

[73] Assignee: Shell Oil Company, Houston, Tex.

[21] Appl. No.: 09/360,764

[22] Filed: Jul. 26, 1999

Related U.S. Application Data

[62] Division of application No. 09/042,976, Mar. 17, 1998.

[51] Int. Cl.$^7$ .................................................... C08F 20/00
[52] U.S. Cl. ................................................ 525/439
[58] Field of Search ............................................. 525/439

[56] References Cited

U.S. PATENT DOCUMENTS

| | | | |
|---|---|---|---|
| 4,462,947 | 7/1984 | Huggard | 264/54 |
| 4,466,933 | 8/1984 | Huggard | 264/54 |
| 4,469,861 | 9/1984 | Mark et al. | 528/196 |
| 4,491,553 | 1/1985 | Yamada et al. | 265/51 |
| 4,544,677 | 10/1985 | Allen et al. | 521/91 |
| 4,587,272 | 5/1986 | Avakian et al. | 521/86 |
| 4,683,247 | 7/1987 | Allen et al. | 521/91 |
| 4,857,628 | 8/1989 | Petri | 528/203 |
| 5,283,285 | 2/1994 | Akkapeddi et al. | 525/67 |
| 5,314,925 | 5/1994 | Burnell et al. | 521/92 |
| 5,360,829 | 11/1994 | Kawabe et al. | 521/81 |

FOREIGN PATENT DOCUMENTS

| | | | |
|---|---|---|---|
| 1579799 | 11/1980 | European Pat. Off. | C08L 67/02 |
| 330602 | 8/1989 | European Pat. Off. | C08J 9/10 |

*Primary Examiner*—Morton Foelak

[57] ABSTRACT

A foamable polyester composition comprising a combination of blowing agent and mixed polymer composition comprising:

a) a semi-crystalline polyester composition comprising a polycondensed branched polyester polymer, and b) an aromatic polycarbonate polymer.

The foamable composition has a high extrusion melt strength, and can pulled across a die without ripping, to form a continuous thermoformable closed cell polyester sheet. The foamed sheets have a uniform, fine, and closed cell morphology; and simultaneously are less dense but have a higher impact strength than comparable closed cell polymers made in only with linear polyesters as the polyester component or without the aromatic polycarbonate.

24 Claims, No Drawings

COMPOSITIONS OF POLYCONDENSED BRANCHED POLYESTER POLYMERS AND AROMATIC POLYCARBONATES, AND THE CLOSED CELL POLYMER FOAMS MADE THEREFROM

This is a division of Application Ser. No. 09/042,976 filed Mar. 17, 1998, the entire disclosure of which is hereby incorporated by reference.

FIELD OF THE INVENTION

The invention relates to polyester polymer compositions and to the closed cell polymer foams made therefrom. In particular, there is provided a semi-semi-crystalline polycondensed branched polyester polymer blended with an aromatic polycarbonate to provide enhanced melt strength to polyesters, and the closed cell polymer foams made therefrom simultaneously having improved impact strength and lower density.

BACKGROUND OF THE INVENTION

Foamed sheets of polyester are often made by extruding a polyester composition out of an annular die and over a "cooling can" after which the somewhat cooled polyester is cut to form a sheet that is taken up on a roll. A common problem encountered in extruding molten polyester onto a moving belt is that the polyester extrudate tears as it is being pulled over the cooling can. This type of failure is often due to the lack of adequate polyester polymer melt strength. A polyester polymer possessing high melt strength resists the tendency of tearing or ripping when subjected to tensile forces. Accordingly, it would be desirable to increase the melt strength of an extrudable polyester polymer to allow a continuous take up of foamed sheet onto a roll and reduce the down time needed to re-align a torn extrudate onto or over a cooling can.

U.S. Pat. No. 4,544,677 is directed to foamable thermoplastic compositions made with a mixture of polycarbonate resins, optionally polyester resins, a foaming agent, and a nucleating agent having a specific aspect ratio. The optional polyester resins disclosed are linear, and additional amounts of acid or glycols could be added in amounts ranging from 0.5 wt. % to 50 wt. % based on the total composition. We have found, however, that linear polyesters are not well suited to extruding foamed sheets because the resin composition has insufficient melt strength. Without sufficient melt strength and die swell, the molten resin both rips and tears as it is pulled over or onto the cooling can, and fails to yield a product with low density. Certain foaming methods, such as injection molding techniques as described in U.S. Pat. No. 544,677, do not require the use of a resin of great melt strength because the resin is not placed under tension or taken up during the foaming of the resin. Accordingly, there remains a need to develop a resin which has high melt strength.

U.S. Pat. No. 5,360,829 discloses foamed polyester sheets made from amorphous polyesters, 20 to 100 parts by weight of a polycarbonate resin based on 100 parts by weight of the polyester, and a nucleating agent in order to impart to the foamed sheet a uniform cellular morphology and a high foaming ratio while maintaining its mechanical properties and dimensional stability. The patentees noted that when crystalline polyesters were blended with polyolefins, the cellular morphology of the resulting foamed sheets was not uniform, and the foaming ratio was too low. Accordingly, the patentees recommended using amorphous polyesters in combination with polycarbonates to overcome this deficiency. Amorphous polyesters, however, even in foamed compositions, suffer the drawback in that they are excluded from being used in high temperature applications. It would be desirable to find an alternative polyester composition that possesses high melt strength without this noted deficiency.

The foamed sheets of polyester find a number of consumer uses, many of which subject the polyester foam sheet to high impacts. Therefore, it is also desirable to make a polyester foam sheet which has high impact strength. One way of doing so is to increase the density of the polyester foam, either by increasing the amount of polymer per unit volume, or by adding reinforcing agents. Neither method is an attractive solution. Both increase the cost of the foam. Further, in the latter method, the amount of reinforcing agent that can be added is limited by the increase in viscosity to the polymer melt resulting from the reinforcing agent.

Attempts to decrease the density of the polyester foam have also lead to a corresponding decrease in the impact strength of polyester foams. It would be highly desirable to make a polyester polymer that overcomes this longstanding direct relationship between the foam density and impact strength; that is, there exists a need to make a polyester foam that simultaneously has a low density and an improved impact strength. Accordingly, in addition to making a polyester polymer which processes well by virtue of its high melt strength, as an additional embodiment, it is desirable to make a polyester foam sheet, and a thermoformed article from the sheet, which has a good cellular structure, low density, and high impact strength.

U.S. Pat. No. 5,502,119 suggests stabilizing blends of polyesters and aromatic polycarbonates with a particular organosilicate. The types of polyesters described therein are not polycondensed branched types of polyesters. U.S. Pat. No. 5,504,130 describes filled thermoplastic compositions where about 15–50% of at least one poly(phenylene ether) resin is compatibilized with about 20–80% of at least one polyester resin by using from 3–50%, preferably of from about 8–20%, of an aromatic polycarbonate having a weight average molecular weight of at least about 40,000. These patents, however, do not address the problem of how to improve the melt strength of polyester compositions, or how to additionally make foamed sheets having good cellular uniformity and high impact strength at low density.

SUMMARY OF THE INVENTION

There is now provided a closed cell polymer comprising a mixed polymer composition comprising:
 a) a semi-crystalline polyester composition comprising a polycondensed branched polyester polymer, and
 b) an aromatic polycarbonate polymer.

This polymer mixture has a high melt strength and can be extruded and pulled across, over, or through a die with a low frequency of ripping or tearing.

In another embodiment of the invention, there is provided a mixed polymer composition comprising:
 a) a polyester composition in an amount of at least 90 wt. %, based on the weight of all polymers in the mixed polymer composition, said polyester composition consisting of polyester polymers, said polyester polymers comprising polycondensed branched polyester polymers, and
 b) aromatic polycarbonate polymers in an amount ranging from 0.01 wt. % to 10.0 wt. %, preferably from 0.01 wt. % to 2.0 wt. %, based on the weight of the mixed polymer composition.

There is also provided a foamable composition comprising a combination of blowing agent and mixed polymer composition comprising:

a) a semi-crystalline polyester composition comprising a polycondensed branched polyester polymer, and b) an aromatic polycarbonate polymer.

Processes for extruding the mixed polymer compositions, making a foamed sheet and thermoforming the foamed sheet made with the mixed polymer composition in the presence of a blowing agent are also included.

An unexpected further advantage observed in the closed cell polymers is that they had a more uniform, fine, and closed cell morphology; and were thicker and less dense than the same closed cell polymers made only with linear polyesters as the polyester component or without the aromatic polycarbonate. The thermoformed sheets made from the foamed sheets using this composition also had a higher impact strength compared to the same thermoformed sheets made only with linear polyesters as the polyester component or without the aromatic polycarbonate.

DETAILED DESCRIPTION OF THE INVENTION

The foamable composition comprises the mixed polymer composition, blowing agent, and any other optional additives, such as impact modifiers, fibers, stabilizers, and flame- retardants. The foamable composition for purposes of calculating amounts of each ingredient includes the sum total of all ingredients used in the embodiment.

The mixed polymer composition comprises:

a) a polyester composition comprising a polycondensed branched polyester polymer, and b) an aromatic polycarbonate polymer;

along with any optional hydrocarbon polymers and oligomers having only carbon, hydrogen, oxygen, and nitrogen, other than impact modifiers.

The polyester composition comprises a polycondensed branched polyester polymer and other polyester polymers.

The closed cell polymer, and the mixed polymer compositions of the invention, are thermoplastic. The mixed polymer compositions, due to their thermoplastic character, can be pelletized and subsequently melt extruded, optionally, further advanced.

A. The Polyester Composition

The a) polyester composition may contain aromatic polyesters, aliphatic polyesters, cycloaliphatic polyesters, or mixtures thereof. The polyester polymers in the polyester composition are preferably derived from at least 50 mole % or more of aromatic polycarboxylic acids, based on the total number of polycarboxylic acids used, more preferably 80% or more, most preferably 100%, based on the weight of all polycarboxylic acids.

The a) polyester composition in one embodiment is semi-crystalline, and it preferably is semi-crystalline when one employs only 10 wt. % or less of an aromatic polycarbonates and at least 90 wt. % of polyester polymers. By a semi-crystalline polyester composition or a semi-crystalline polyester polymer is meant one which has a degree of crystallinity of at least 15%, cooled to and measured at 25° and at about 1 atmosphere. The % crystallinity is conveniently determined by DSC, Differential Scanning Calorimetry. In another preferred embodiment, the degree of crystallinity is 20%–40%, more preferably 25% to 35%, each at 25° C. In other more preferred embodiments, the degree of crystallinity is at least 15% at 40° C., most preferably at least 15% at 60° C. It is within the scope of one embodiment of the invention, however, to provide a mixed polymer composition comprising a polyester composition, which may be amorphous for applications which are not subjected to high temperatures.

The mixed polymer composition comprises an a) polyester composition at least a portion of which must contain polycondensed branched polyester polymers. The polycondensed branched polyester polymers may be aromatic, aliphatic, or cycloaliphatic. By a polycondensed branched polyester polymer or a polycondensed branched polyester composition is meant a polymer or a composition containing polymers derived from polycondensation branching agents having active hydrogen functionalities effective to form condensation linkages. While the type of functionality of the polycondensation branching agent may include amines, isocyanates, or thiols, the preferred type of functionality on the polycondensation branching agent is a hydroxyl group or a carboxylic acid group to form ester-linkages. The polycondensation branching agent has an average functionality of greater than two, preferably greater than 2.5, more preferably 3.0 or more. The polycondensation branching agent provides a means to create a molecule which contains a number of high molecular weight branches, e.g. on the order of 5,000 $M_w$ or more, the number of branches corresponding to the number of functional sites on the polycondensation branching agent. The presence of these polycondensed branched polymers improves the melt strength of a molten polyester composition exiting a die head, and further improves the impact strength of the resulting foam.

Accordingly, one may react a polycarboxylic acid containing an average carboxylic acid functionality of greater than two, with a diol monomer. Alternatively, dicarboxylic acids can be used to react with a polyol containing an average hydroxyl functionality of more than 2. Or, if desired, a mixture of di- and higher polycarboxylic acids can be made to react with a mixture of di- and higher polyols.

The particular structure of the polycondensation branching agent is not limited, so long as the average active hydrogen functionality is greater than 2. In general, those molecules having $C_1$–$C_{19}$ alkyl, alkaryl, aralkyl, cycloaliphatic, or aromatic moieties are suitable. Preferred polycondensation branching agents are the carboxylic acid and hydroxyl functional compounds.

Illustrative examples of the polycarboxylic acids having an average functionality of greater than 2 are benzenetricarboxylic acid, , benzophenone tetracarboxylic acid, oxoisophthalic acid, pyromellitic acid, trimesic acid, trimellitic acid, citric acid, the anydrides or salts thereof, or mixtures thereof. Dicarboxylic acids may also be mixed with these acids to achieve the desired functionality. Instead of using the free acids, the corresponding polycarboxylic acid derivatives may also be used such as polycarboxylic acid mono-, di-, tri-, or higher esters of alcohols with 1 to 4 carbons.

Illustrative examples of polyol monomers having a nominal functionality of greater than two are trimethylolethane, 1,2,6-hexanetriol, alpha -methyl glucoside, glycerine, sucrose, glucose, mannose, fructose, trimethylol propane, mannitol, sorbitol, pentaerythritol, and the higher molecular weight polyoxyalkylene polyether adducts made by reacting these polyols with alkylene oxides. The higher functional polyols can be mixed together to provide blends having the desired functionality, such as blends of glycerine and sucrose, or blends of pentaerythritol and glycerine or trimethylol propane. Alternatively, the higher functional polyols can be mixed with diols to provide a blend having the desired functionality, such as ethylene glycol blends with glycerine, pentaerythritol, and/or sucrose. Suitable diols for admixture are those mentioned below with respect to making linear polyester polymers.

The amount of the polycondensation branching agent used is effective to improve the melt strength of the composition at the die head. Suitable amounts of the polycondensation branching agents in the polyester composition range from 0.01 to 5.0 mole % of polycondensation branching agent based on the total moles of all monomers used to make the a) polyester composition. The large improvement in melt strength is observed using amounts of polycondensation branching agent as low as from 0.05 to 1.0 mole %. On a weight percentage, the amount of the polycondensation branching agent is preferably less than 1.0 wt. % based on the weight of the a) polyester composition, more preferably 0.2 wt. % or less, most preferably 0.15 wt. % or less, especially when the polycondensation branching agent has an average molecular weight of 150 or less. Without being bound to a theory, it is believed that the small molar amount of polycondensation branching agent relative to the moles of other polyester forming monomers, coupled with the lack of free reactive sites on the growing independent polymer chains, favors polyester chain growth through acid-glycol reactions across the polycondensation branching agent reactive sites and continuing outward across the growing polyester branch, over crosslinking reactions occurring between the reactive sites on polycondensation branching agents and inner portions along the independently developing polyester polymer molecules. Accordingly, the polyester composition maintains its thermoplastic character.

The remainder of the a) polyester composition comprises any of the known polyester polymers. Other suitable polyester polymers are those which contain repeat units which are derived from diacids other than terephthalic acid and/or glycols in addition to or other than ethylene glycol. For instance, other suitable acids include isophthalic acid, naphthalenic dicarboxylic acid, 1,4-cyclohexane dicarboxylic acid, 1,3-cyclohexane dicarboxylic acid, succinic acid, glutaric acid, adipic acid, sebacic acid, 1,12-dodecane dioic acid, and the functional acid derivatives thereof such as the dimethyl, diethyl, or dipropyl esters of the dicarboxylic acids. Further, the anhydrides or the acid halides of these acids may be employed In addition to the commonly used ethylene glycol and diethylene glycol monomer for making an aromatic polyester polymer, other suitable diol residues include, in addition to or replacing, but preferably only up to 20 mole percent, the linear diols such as propylene glycol, 1,3 propane diol, triethylene glycol, 2,4-dimethyl-2-ethylhexane-1,3-diol, 2-ethyl-2-butyl-1,3-propane diol, 2-ethyl-2-isobutyl-1,3-propane diol, 1,3-butane diol, 1,4-butane diol, 1,5-pentane diol, 1,6-hexane diol, 1,2-, 1,3- and 1,4-cyclohexane dimethanol, 2,2,4,4-tetramethyl-1,3-cyclobutane diol, 1,4-xylylene-diol, and the longer chain diols and polyols.

Any method of making the a) polyester composition is included within the scope of the invention. Conventional methods include reacting the acid or its ester derivative with the glycol/polyol component or its ester forming derivative under heat in the presence or absence of an ester-interchange catalyst or an esterification catalyst, and then heating in the presence of a polymerization catalyst. The polycondensed branched polyester polymer may be separately manufactured, isolated, and subsequently added to the polyester composition, or the a) polyester composition can be branched in situ by adding the polycondensation branching agent to the monomers during the manufacture of the polyester composition, preferably the latter for ease of handling and processing.

The operating conditions for the polyester polymerization are generally known to those skilled in the art of preparing polyester polymers and copolymers. The polymerization temperature is generally from about 250° C. to about 295° C., depending upon the monomer units present, and is preferably operated in the range of 265° C. to 285° C. The pressure used for the polycondensation reaction is gradually reduced-over the course of the reaction, from atmospheric pressure to a high vacuum of less than 1 torr. In another embodiment, the polyester polymer may be made under transesterification conditions, which are also known to those in the art.

Suitable polymerization catalysts include the compounds of lithium, sodium, potassium calcium, barium, magnesium, manganese, cobalt, germanium, antimony, lead, tin, copper, titanium, palladium, platinum, gold, or silver. Preferable as catalysts are those compounds which can be reduced to elemental form which may assist in the reduction of cycle times in the mold or the time required to re-heat the polyester polymers in such operations as blow molding. Particularly preferable are antimony compounds, such as antimony trioxide and antimony acetate.

Stabilizers can be added which include phosphoric acids, phosphorous acids, orthophosphoric acids, phosphonic acids, and derivatives of these such as triphenyl phosphite, trimethyl phosphate, triphenyl phosphate, dimethyl mono-$\beta$-hydroxyethyl phosphate, mono-methyl di-$\beta$-hydroxyethyl phosphate, tri-$\beta$-hydroxyethyl phosphate, phenylphosphonic acid, and dimethyl dibenzylphosphonate. The preferred stabilizers are those which are capable of reducing the polyester polymerization catalyst compound to its metallic elemental form.

The process for polymerization is preferably carried out with the use of a "heel." The heel is an esterification product recycled to the initial stages of the esterification reaction to increase the solubility of the dicarboxylic acid, thereby increasing the reaction rate of the dicarboxylic acid and the diol. The use of a heel is explained in U.S. Pat. No. 4,020,049 (Rinehart), and may be applied to both continuous and batch manufacturing processes.

The molecular weight of the copolymers produced by the process of this invention may be increased by polymerization in the solid state. The solid state polycondensation reaction is conducted at temperatures from about 190° C. to about 250° C., in the presence of an inert gas (e.g. nitrogen). The inert gas serves to remove reaction byproducts, such as excess diol and water. The solid state polymerization reaction is generally continued until the polymer reaches an intrinsic viscosity of 0.65 dl/g or more. The intrinsic viscosity of the polyester polymer composition, as well as the intrinsic viscosity of the polycondensed branched polyester polymer, suitably ranges from 0.65 to 1.75 dl/g, more preferably from 0.95 to 1.5 dl/g.

The polyester copolymer produced in the melt polymerization process preferably contains a carboxyl content that provides an enhanced solid state polymerization rate. A method for producing polyester polymers with an optimum carboxyl content is described in U.S. Pat. No. 4,238,593 (Duh).

B. The Polycarbonates

Any conventional aromatic polycarbonate composition is suitable for use in the invention. Both linear and branched aromatic polycarbonates are suitable for use in the invention. Linear aromatic polycarbonates improve the impact strength of foamed sheets. The impact strength of foamed sheets at both room temperature and at −20° C., however, can be improved by using branched aromatic polycarbonates. The particular polycarbonate chosen may depend upon the application and desired properties, but where the end use is in contact with food, FDA approved polycarbonates are the material of choice.

Aromatic polycarbonates are materials known per se. They are generally prepared by reacting a dihydric phenol compound with a carbonate precursor, for example, phosgene, a halogen formate or a carbonate ester, according to the procedures and materials identified in U.S. Pat. Nos. 4,098,750, 4,123,436, 3,169,121, and U.S. Pat. No. 3,153,008, each incorporated herein by reference.

Aromatic polycarbonates are polymers that comprise units of the formula:

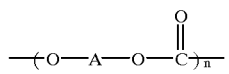

wherein A is a multivalent aromatic radical derived from the polyhydric phenol used in the preparation of the polymer, and n represents the number of repeat carbonate units. Mononuclear or polynuclear aromatic compounds which comprise two or more hydroxy radicals, which are each directly bonded to a carbon atom of an aromatic nucleus, may be used as polyhydric phenols in the preparation of the aromatic polycarbonates.

Examples of suitable dihydric phenols are: 2,2-bis-(4-hydroxyphenyl)propane; 2,2-bis(3,5-dimethyl-4-hydroxyphenyl)propane; 2,2-bis(3,5-dibromo-4-hydroxyphenyl)propane; 2,2-bis(3,5-dichloro-4-hydroxyphenyl)propane; hydroquinone; resorcinol; 2,2-bis-(4-hydroxyphenyl)pentane; 2,4'-(dihydroxy diphenyl) methane; bis(2-hydroxyphenyl)methane; bis-(4-hydroxyphenyl)methane; bis-(4-hydroxy-5-nitrophenyl) methane; 1,1-bis-(4-hydroxyphenyl)ethane; 3,3-bis(4-hydroxyphenyl)pentane; 2,6-dihydroxy naphthalene; bis-(4-hydroxydiphenyl)sulfone; bis-(3,5-diethyl-4-hydroxyphenyl)sulfone; 2,2-bis-(3,5-dimethyl-4-hydroxyphenyl)propane; 2,4'-dihydroxyphenyl sulfone, 5'-chloro-2,4'-dihydroxydiphenylsulfone; bis-(4-hydroxyphenyl) diphenyl sulfone; 4,4'-dihydroxydiphenyl ether; 4,4'-dihydroxy-3,3-dichlorodiphenyl ether; 4,4'-dihydroxy-2,5-dihydroxy diphenyl ether. The aromatic polycarbonates can also be used as mixtures of the aforementioned polycarbonates. Particularly useful aromatic polycarbonates are those derived from Bisphenol A.

The branched aromatic polycarbonates suitable for use in the invention are any of those commercially available. Their method of manufacture are known. In general, the branched aromatic polycarbonates may be made by reacting a carbonate precursor, for example, phosgene, a halogen formate or a carbonate ester with a branching agent having more than two active hydroxyl functionalities. Examples of branching agents having more than two active hydroxyl functionalities are the polyol branching agents mentioned above with respect to the polycondensed branched polyester polymer. Alternatively, the branching on the branched aromatic polycarbonate may be provided by employing a branching agent having only two active hydrogen functionalities but with a highly branched non-reactive alkyl, cycloalkyl, alkaryl, aralkyl, or aryl network such as those described in U.S. Pat. No. 4,469,861, incorporated herein by reference. Examples of these branches are $C_2$–$C_{10}$ alkyl, $C_5$–$C_{15}$ cycloalkyl, or $C_6$–$C_{20}$ aryl, aralkyl, or alkaryl aromatic branches.

The term polycarbonate is also intended to embrace polyesterpolycarbonates (PCC). The PCC's for use in the invention are known and some can be obtained commercially. Generally, they are copolyesters comprising recurring carbonate groups and aromatic carbocyclic groups in the linear polymer chain, in which at least some of the carboxylate groups and at least some of the carbonate groups are bonded directly to ring carbon atoms of the aromatic carbocyclic groups. These poly(ester-carbonate) copolymers, in general, are prepared by reacting a difunctional carboxylic acid, such as phthalic acid, isophthalic acid, terephthalic acid, homophthalic acid, o-, m-, and p-phenylenediacetic acid, 2,6-naphthalene dicarboxylic acid, mixtures of any of the foregoing, and the like with a dihydric phenol and a carbonate precursor, of the types described above. A particularly useful polyester carbonate is derived from bisphenol-A, isophthalic acid, terephthalic acid, or a mixture of isophthalic acid and terephthalic acid, or the reactive derivatives of these acids such as terephthaloyl di-chloride, isophthaloyl dichloride, or a mixture thereof, and phosgene.

Aromatic dihydric phenol sulfone resins can also be used as the aromatic polycarbonate. For example homopolymers of dihydric phenol, and a dihydroxydiphenyl sulfone and a carbonate precursor can be prepared.

The Mixed Polyester Composition

The amount of aromatic polycarbonate in the mixed polymer composition is effective to improve at least the melt flow strength of the mixed polymer composition. Suitable amounts of the aromatic polycarbonate range from 0.05 wt. % to 10 wt. % based on the weight of the mixed polymer composition. However, we have found that amounts of aromatic polycarbonate ranging from 0.1 to 2.0, more preferably 1.5 wt. % or less, based on the weight of the mixed polymer composition, are effective to obtain a mixed polymer composition having excellent melt flow strength and impact strength when thermoformed into articles. In a preferred embodiment, one may add amounts of polycarbonate as low as from 0.2 to 1.0 wt. %, based on the weight of the mixed polymer composition, to attain the benefits associated with improved melt flow strength and impact strength.

In another embodiment of the invention, the mixed polymer composition comprises at least a polyester composition which consists of polyester polymers in an amount of at least 90 wt. %, more preferably 97 wt. % or more, based on the weight of all polymers in the mixed polymer composition, the polyester polymers comprising polycondensed branched polyester polymers; and an aromatic polycarbonate polymer in an amount of from 0.01 to 10 wt. %, more preferably 0.01 to 1.5 wt. %, based on the weight of the mixed polymer composition. In the more preferred embodiment, the polyester polymers are the reaction product of from 0.01 to 1.0 mole percent of the polycondensation branching agent.

The polyester composition and the polycarbonate are blended together. In addition to improved melt flow strength and impact strength, another advantage of the invention lies in that the mixed polymer composition remains essentially as a blend of the polycondensed branched polyester and the aromatic polycarbonate even at extrusion processing temperatures, which exceed the melt temperature of the resins, based on LC mass-spectrometer analytical techniques. Analytical screening of the articles produced after foam extrusion using an LC mass-spectrometer failed to detect the presence of transesterification products between the polyester and the polycarbonate, indicating that the polyester and the polycarbonate remain substantially as a blend throughout their processing life without the production of detectable by-products.

Any method of blending is appropriate. One convenient method comprises precompouding by blending the polyester and polycarbonate resins and other ingredients in powder or granular form, extruding the blend and comminuting into pellets or other suitable shapes. The ingredients are combined in any usual manner, e.g., by dry mixing or by mixing in the melted state in an extruder, on a heat mill or in other mixers. An alternative method of blending can comprise preparing a preblend of the polyesters and then adding the polycarbonate and other ingredients and additives to the preblend at the extruder used to make a foamed sheet. Alternatively, each ingredient can be added separately by hopper at the foam extruder.

The other ingredients that may be included within the meaning of a mixed polymer composition include other hydrocarbon polymers and oligomers having only carbon, hydrogen, oxygen, and nitrogen, such as nucleating agents, but not impact modifiers. While some nucleating agent packages may include small amounts of polymers containing halogen atoms, these polymers are included within the meaning of a nucleant and within the scope of a mixed polymer composition.

D. The Foamable Composition

To the mixed polymer composition may be added those other additives which are not polymers or oligomers exclusively made of carbon, oxygen, hydrogen, and nitrogen, such as blowing agents, fillers, flame retardants, uv- and other stabilizers, impact modifiers, anti-oxidants, drip retardants, dyes, pigments, colorants, antistatic agents, plasticizers and lubricants. These additives are known in the art, as are their effective levels and methods of incorporation. Their amounts vary depending upon the type of additive, but generally, the mixed polymer composition will comprise at least 40 wt. % of all the ingredients used to make an foaming composition, preferably at least 80 wt. %, more preferably at least 95 wt. %.

The type of blowing agent used to foam the polymer is not limited. Common physical blowing agents include nitrogen gas, carbon dioxide gas, halogenated gases, propane, butane, pentane, hexane, helium, neon, argon and krypton. Inert gases can be used in extrusion foaming, and are preferred because of their handling ease, environmental friendliness, and reduced cost.

Other physically active blowing agents are those which boil at extrusion temperatures or less. These include volatile non-halogenated hydrocarbons having two to seven carbon atoms such as alkanes, alkenes, cycloalkanes having up to 6 carbon atoms, dialkyl ethers, cycloalkylene ethers and ketones; hydrochlorofluorocarbons (HCFCs); hydrofluorocarbons (HFCs); perfluorinated hydrocarbons (HFCs); fluorinated ethers (HFCs); and decomposition products. Specific examples include butane, isobutane, 2,3 dimethylbutane, n- and isopentane and technical-grade pentane mixtures, cyclopentane, n- and isohexanes, cyclohexane, n- and isoheptanes, n- and isooctanes, n- and isononanes, n- and isodecanes, n- and isoundecanes, and n- and isododecanes, and in particular cyclopentane and/or pentane. Perfluorocarbons or fluorinated ethers include hexafluorocyclopropane (C-216); octafluorocyclobutane (C-318); perfluorotetrahydrofuran; perfluoroalkyl tetrahydrofurans; perfluorofuran; perfluoro-propane, -butane, -cyclobutane, -pentane, -cyclopentane, and -hexane, -cyclohexane, -heptane, and -octane; perfluorodiethyl ether; perfluorodipropyl ether; and perfluoroethyl propyl ether. Suitable hydrofluorocarbons include difluoromethane (HFC-32); 1,1,1,2-tetrafluoroethane (HFC-134a); 1,1,2,2-tetrafluoroethane (HFC-134); 1,1-difluoroethane (HFC-152a ); 1,2-difluoroethane (HFC-152), trifluoromethane; pentafluoropropane (245b); heptafluoropropane (R-227a); hexafluoropropane (R-136); 1,1,1-trifluoroethane; 1,1,2-trifluoroethane; fluoroethane (R-161); 1,1,1,2,2-pentafluoropropane; pentafluoropropylene (R-2125a); 1,1,1,3-tetrafluoropropane; tetrafluoropropylene (R-2134a); difluoropropylene (R-2152b); 1,1,2,3,3-pentafluoropropane; and 1,1,1,3,3-pentafluoro-n-butane. One may also use chemical blowing agents which decompose on heating to release a gas such as $N_2$ or $H_2$. Examples include hydrazine derivatives such as azocarbanoamide, 5-phenyltetrazole, sulfonly hydrazide, sulfonyl semicarbazide and sodium borohydride.

In addition to blowing agents, foaming nucleating agents can be used, such as glass, talc, silica and mica. These agents have a lower specific gravity than metals, are inexpensive because they are mass produced, and stable quantities of uniform particle size are easily obtainable. These nucleating agents may be used either singly or in combination. Other foaming aids include organic acids, Ca, Zn, Mg, Ba, Al, Pb and Mn salts of organic acids, and organic acid esters.

The amount of blowing agent is determined primarily by the desired sheet density and the efficiency of the blowing agent used. In general, the amount of blowing agent ranges from 1 pbw (part by weight) to 10 pbw based on 100 pbw of the mixed polymer composition. The amount of blowing agent when using the mixed polymer composition can be reduced to make a foam sheet of the same density as compared to a foam sheet made without a polycondensed branched polyester or without an aromatic polycarbonate.

To the mixed polymer composition may also be added flame retardants as needed. Examples of suitable phosphate flameproofing agents are tricresyl phosphate, tris(2-chloroethyl) phosphate, tris(2-chloropropyl) phosphate, and tris(2,3-dibromopropyl) phosphate. In addition to these halogen-substituted phosphates, it is also possible to use inorganic or organic flameproofing agents, such as red phosphorus, aluminum oxide hydrate, antimony trioxide, arsenic oxide, ammonium polyphosphate (Exolit Registered TM ) and calcium sulfate, molybdenum trioxide, ammonium molybdate, ammonium phosphate, pentabromodiphenyloxide,2,3-dibromopropanol, hexabromocyclododecane, dibromoethyldibromocyclohexane, expandable graphite or cyanuric acid derivatives, e.g., melamine, or mixtures of two or more flameproofing agents, e.g., ammonium polyphosphates and melamine, and, if desired, corn starch, or ammonium polyphosphate, melamine, and expandable graphite.

To the mixed polymer composition may also be added fillers. Of the additives, fillers usually account for the largest weight percent of any additive. The amount of filler can range from 0 to 60 pbw based on 100 pbw of the mixed polymer composition. Suitable fillers are conventional organic and inorganic fillers and reinforcing agents. Specific examples are inorganic fillers, such as silicate minerals, for example, phyllosilicates such as antigorite, serpentine, hornblendes, amphiboles, chrysotile, and talc; metal oxides, such as kaolin, aluminum oxides, titanium oxides and iron oxides; metal salts, such as chalk, barite and inorganic pigments, such as cadmium sulfide, zinc sulfide and glass; kaolin (china clay), aluminum silicate and coprecipitates of barium sulfate and aluminum silicate, and natural and synthetic fibrous minerals, such as wollastonite, metal, and glass fibers of various lengths. Examples of suitable organic fillers are carbon black, melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers.

The filamentous glass that may be employed as a reinforcing agent in the present compositions is well known to those skilled in the art and is widely available from a number of manufacturers. Examples include "E" glass and "C" glass. The filaments are made by standard processes, e.g., by steam or air blowing, flame blowing and mechanical pulling. The filament diameters generally range from about 0.003 mm to 0.15 mm. Further, the glass fibers may also be treated with functionalized silicon compounds to improve interaction with the polymer matrix, as is well known to those skilled in the art. Functionalized silanes, especially alkoxy silanes may be useful in this regard.

The length of the glass filaments is also not critical. However, in preparing molding compositions it is convenient to use the filamentous glass in the form of chopped strands of from about 0.03 to about 25 mm long. In articles molded from the compositions on the other hand, even shorter lengths will be encountered due to fragmentation during compounding.

In particular, it is preferred to used micro glass fibers having an aspect ratio of greater than 1000, more preferably from about 2000 to about 5000, with a mean fiber diameters of 1 micron or less in order to increase the apparent melt strength viscosity of the mixed polymer composition at low or no shear, as well as lower its apparent melt flow viscosity at higher shear rates.

Impact modifiers may also be added. Impact modifiers generally comprise an acrylic or methacrylic grafted polymer of a conjugated diene or an acrylate elastomer, alone, or copolymerized with a vinyl aromatic compound. On type of impact modifier is the core-shell polymer of the type available from Rohm & Haas, for example, those sold under the trade designation Acryloid®. In general these impact modifiers contain units derived from butadiene or isoprene, alone or in combination with a vinyl aromatic compound, or butyl acrylate, alone or in combination with a vinyl aromatic compound. The aforementioned impact modifiers are believed to be disclosed in Fromuth et al., U.S. Pat. No. 4,180,494; Owens, U.S. Pat. No. 3,808,180; Farnham et al., U.S. Pat. No. 4,096,202; and Cohen et al., U.S. Pat. No. 4,260,693.

The impact modifier may comprise a two-stage polymer having either a butadiene or butyl acrylate based rubbery core and a second stage polymerized from methylmethacrylate alone, or in combination with styrene. Also present in the first stage are crosslinking and/or graftlinking monomers. Examples of the crosslinking monomers include 1,3-butylene diacrylate, divinyl benzene and butylene dimethacrylate. Examples of graftlinking monomers are allyl acrylate, allyl methacrylate and diallyl maleate. Additional impact modifiers are of the type disclosed in U.S. Pat. No. 4,292,233. These impact modifiers comprise, generally, a relatively high content of a butadiene polymer grafted base having grafted thereon acrylonitrile and styrene. Other impact modifiers include, but are not limited to ethylene vinyl acetate, ethylene ethylacrylate copolymers, SEBS (styrene-ethylene-butylene styrene) and SBS (styrene-butadiene-styrene) block copolymers, EPDM (ethylene propylene diene monomer) and EPR (ethylene propylene rubber) copolymers, etc. All of these are well known to those skilled in the art and are available commercially.

The mixed polymer composition of the invention can be blended with other thermoplastic polymers. Examples of other polymers suitable for blending include elastomers, polycarbonate, other types of polyester thermoplastics, polyethylene, polypropylene, ethylene-propylene copolymers, ethylene-vinyl acetate copolymers, polyamides, polystyrenes, styrene-butadiene copolymers, styrene-butadiene-acrylonitrile copolymers, styrene-acrylonitrile copolymers, polyurethanes, fluoroplastics, polyphenylene oxides, polyphenylene sulfide, polybutadiene, polyolefin halides, vinyl polyhalide, butyl rubbers, silicone rubbers, and graft copolymers of polyacrylates.

In accordance with a process of the invention, a foamable composition comprising a mixed polymer composition is extruded under process conditions effective for the formation of a closed cell polymer, wherein the mixed polymer composition comprises:

a) a semi-crystalline polyester composition comprising a polycondensed branched polyester polymer, and b) an aromatic polycarbonate polymer.

More specifically, the closed cell polyester polymer foam of the invention can be produced by a process which comprises:

(1) feeding the mixed polymer composition along with optional additives into an extruder, preferably a melt extruder to conduct melt-mixing, (2) incorporating a blowing agent into the resulting molten mixture while in the extruder, preferably while in the melt extruder, and (3) extruding the mixture out of a die, preferably an annular die, to form a cellular polyester foam, preferably in the form of a sheet in a continuous fashion.

Any extruder can be used. The process can be carried out by a plasticating extruder or a single or twin screw melt extruder. The screws extrude, from a metal die, the molten thermoplastic resin containing the cells having the inert gas uniformly dispersed therein to continuously form a sheet in an intended shape. A single-screw extruder is used in most cases. However, in some cases, a twin-screw extruder or a multiple screw extruder having substantially the same function, is desirable.

The mixed polymer composition and the additives may be premixed or separately fed into the extruder hoppers. The mixed polymer composition itself may be preblended or fed into the extruder through its individual components. The order of blending or addition to the extruder is not limited. For example, the aromatic polycarbonate may be pre-blended with a nucleating agent and fed into the extruder through a hopper, along with the polyester composition fed through a separate hopper. Alternatively, the aromatic polycarbonate and the polyester composition may be pre-blended and fed into the extruder through a single hopper.

The mixed polymer composition along with optional additives are mixed and heated in a solid transfer zone and then sent to a melting zone. The melting zone is maintained at a temperature higher than a melting point of the molten resin and causes melting, suction- discharging and mixing at the same time. The molten resin is carried to a melt transfer zone. In the melt transfer zone, the blowing agent is forced into the molten resin, and sufficient mixing is conducted to uniformly disperse the blowing agent throughout the molten resin. Since the resin fed from the melting zone into the melt transfer zone which is designed to have a slightly lower temperature, it has a higher melt viscosity in the melt transfer zone. This prevents the blowing agent from flowing back through the extruder and escaping through the hopper. The blowing agent may be fed as a gas or a liquid or generated in situ by the decomposition of a chemical blowing agent.

The molten mixed polymer composition along with the blowing agent and optional additives (extrudate) are usually extruded from the sheet-forming die using a metering pump. The metering pump and the sheet-forming die are kept at a temperature which maximizes the polymer melt strength. It is preferred to extrude a tube that can allow slit opening and thermoforming, using a circular or annular die. Other configurations such as a flat sheet die can also be used. The resulting foamed polyester sheet is cooled by air cooling, water cooling or contacting with a chilled roll without stretching.

The mixed polymer composition of the invention, along with the blowing agent and optional additives, are suited to make a closed cell polymer comprising the mixed polymer composition comprising the polycondensed branched polyester polymer and the aromatic polycarbonate polymer. The closed cell polymer of the invention can be produced as low density sheets having a small, uniform cellular morphology while retaining high impact strength when thermoformed into articles. The free rise density of the closed cell polymer is not particularly limited, but advantageously is from 0.5 g/cc or less, and is advantageously 0.5 g/cc or less as a thermoformed closed cell polymer. Preferably, the free rise density of the closed cell polymer is 0.30 g/cc or less. The density will usually exceed 0.01 g/cc. The combination of a lower density and retention or improvement in impact strength, or the combination of lower density and high melt strength, is unexpectedly present in the closed cell polymer of the invention compared to a comparable closed cell polymer made with the same amount and type of ingredients but with a linear polyester or without the aromatic polycarbonate. Accordingly, the density of the closed cell polymer, even a thermoformed closed cell polymer, can be reduced by 10% or more, even 15% or more, most preferably 20% or more, compared to a cellular polymer made with the same ingredients except without the polycondensed branched polyester or without the aromatic polycarbonate.

The closed cell polymers of the invention will generally have a mean cell diameter in the range of 150 μm to 250 μm. The cells are substantially uniformly distributed throughout the foam sheet in this range. The closed cell polymer has a closed cell content of at least 70%, more preferably at least 80%, most preferably at least 85%.

The thickness of the closed cell polymer is not limited, but is generally in the shape of a sheet 5 mils to 2000 mils thick. For many applications, the closed cell polymer thickness will range from 30 mils to 200 mils. The closed cell polymers of the invention can be made to thicker sheets using the mixed polymer composition of the invention than can be made using the same composition with the same amount and types of blowing agent and other additives except without an aromatic polycarbonate or with a linear polyester. Without being limited to a theory, it is believed that the enhanced melt strength attributable to the aromatic polycarbonate-polycondensed branched polyester combination prevents cell walls from rupturing, thereby promoting greater uniformity among cell sizes, density reduction, and a larger number of cells formed to provide a thicker foam.

The impact strength of the closed cell polymer is improved over a closed cell polymer made with the same types and amounts of ingredients but with a linear polyester or without an aromatic polycarbonate, in whatever form, whether as a sheet or thermoformed. We have observed a 20% or more improvement in room temperature Dynatup impact strength in thermoformed closed cell polymers of the invention measured at the same thickness against comparative thermoformed closed cell polymers made with the same amount and type of ingredients except with a linear polyester or without an aromatic polycarbonate. Since the foamed sheets of the invention can be made substantially thicker, the improvement in Dynatup impact strength can be 40% or more, even 50% or more, when measured as a thermoformed article, compared to a an article thermoformed under the same conditions but which is made with a linear polyester composition or made without the aromatic polycarbonate. At the colder temperature of −20° C., the dynatup impact strength of the closed cell polymer, whether as a sheet or thermoformed, is also improved, often by as much as 30% or more, compared against a comparable foam as described above, at the same thickness. The improvement in impact strength may be 40% or more.

In another embodiment, the closed cell polymers of the invention have an improved ratio of impact strength to density. In another embodiment of the invention, the ratio of dynatup impact strength in pounds at room temperature to the density of thermoformed closed cell polymers measured in g/cc is at least 100:1, and more preferably is at least 120:1, without fillers or reinforcing agents. Measured at −20° C. in another embodiment, the ratio of the dynatup impact strength in pounds to the density of the closed cell polymer of the invention in g/cc is at least 40:1, more preferably at least 50:1. These values represent a significant improvement over comparable closed cell polymers as described above.

The improvement in melt strength can be detected by the degree of die swell in an extrusion process. We have observed a 10 fold increase or more in die swell when extruding the composition of the invention compared to comparable compositions as described above. In some cases, the die swell may increase by 25 fold or more using the composition of the invention. In some cases, the die opening is increased to alleviate pressure increases in the extruder due to the increased die swell.

The closed cell polymer of the invention can be thermoformed into a heat-set thin article with an ordinary thermoforming device. Such thermoforming method comprises:
1. a step of preheating the foamed polyester sheet until it is softened, and positioning it in a mold,
2. a step of pressing the preheated sheet onto a heated mold surface,
3. a step of contacting the sheet with the heated mold for a time sufficient to advance the crystallization of the polyester and heat-set the sheet, and
4. a step of withdrawing the sheet from the cavity of the mold.

The articles made using the mixed polymer composition of the invention are not limited. The mixed polymer compositions can be used to make non-foamed and foamed articles, but are well adapted for extrusion into thermoformable foamed sheets which are subsequently thermoformed. Examples of suitable articles and applications, both as cut or shaped sheets or thermoformed articles, are food and oven trays, cups, and plates, each optionally and preferably foamed, on which food or liquid is heated by radiant, convection, or microwave energy; utensils, boxes, pipes, cards, yarns, fibers, films, beverage bottle preforms and monoaxial or biaxial stretch blow moldings such as beverage bottles, photographic and packaging films, interior articles, parts for machines and automobiles, building insulation, and flotation devices such as surfboards and boat hull foams.

The invention is now further illustrated by way of non-limiting examples.

WORKING EXAMPLES

PET 1: is a branched polyester polymer obtained by reacting terephthalic acid with 0.2 mole percent pentaerythritol, based on the moles of terephthalic acid, the polyester having an intrinsic viscosity of 1.2, containing 0.2 weight percent fumed silica.

PET 2: is a branched polyester polymer obtained by reacting terephthalic acid with 0.15 mole percent pentaerythritol, based on the mole percent of terephthalic acid, the polyester polymer having an intrinsic viscosity of 0.95, containing 0.2 weight percent fumed silica.

PET 3: is a branched polyester polymer obtained by reacting terephthalic acid with 0.05 mole percent pentaerythritol, based on the moles of terephthalic acid, the polyester polymer having an intrinsic viscosity of 0.95, containing 0.2 weight percent fumed silica.

PET 4: is a branched polyester polymer obtained by reacting terephthalic acid with 0.2 mole percent pentaerythritol, based on the moles of terephthalic acid, having intrinsic viscosity of 1.2, and containing no fumed silica.

PET 5: is a linear polyester polymer having intrinsic viscosity of 0.95 commercially available from Shell Chemical Company as TFF 9506.

RDN™-1: is a nucleant package commercially available from Shell Chemical Company.

MAKROLON®3200: is a linear polycarbonate resin commercially available from Bayer.

MAKROLON®1143: is a linear polycarbonate resin commercially available from Bayer.

MAKROLON®3208: is a linear polycarbonate resin having FDA approval, commercially available from Bayer.

MAKROLON®Ku11239: is a branched polycarbonate resin with a melt flow of less than 2.5, FDA approved and targeted for blow molding, commercially available from Bayer.

LEXAN®141: is a linear polycarbonate resin commercially available from General Electric.

In each of the examples, the polyester polymer, both branched and linear, was processed through a twin screw extruder at different levels of polycarbonate resin to test the melt strength of the blend over the extruder die. The closed cell polymer in the form of a microcellular foam sheet extruded across the die was then thermoformed into bundt pans, which were subsequently tested for their Dynatup impact properties.

In each of the examples, the extruded microcellular foam sheet was ZMD vacuum thermoformed in a metal bundt pan mold. The molding conditions are specified in each working example.

Example 1

In this example, a Leistritz Micro 27 GL-32 twin screw extruder having 32L/D twin co-rotating screws was used to pre-blend and pelletize a polycarbonate resin and a nucleant package, RDN-1 as follows: MAKROLON® polycarbonate was fed from the main feeder at a rate of 18 pounds per hour, and the RDN-1 nucleant package was fed from the K-2V auxiliary feeder at a rate of 12 pounds per hour. The extruder temperature was set at a profile of 260–300° C. The extruder screw speed was set to 200 rpm. The resin was pelletized and dried at 90° C. for 16 hours before proceeding to the next step.

A closed cell polymer in the form of a foamed sheet was prepared by the following procedure. The Leistritz twin screw extruder was equipped with an EDS-8 inch flat die. The dried polycondensed branched PET 1 was fed into the extruder at the T-20 main feeder at a rate of 40 pounds per hour. The extruder screw speed was about 200 rpm and the temperature profile was about 260–300° C. Simultaneously, the K-2V auxiliary feeder having a single screw delivered 1.2 pounds per hour of the pelletized linear polycarbonate resin-RDN-1 nucleant package at the feed port of the extruder to make a mixed polyester composition containing 1.8 weight percent of the polycarbonate resin. Nitrogen gas blowing agent was injected into the molten mixed polyester composition at zone 8 at a gas rate of 0.1 SLM. A sample of the extruded foam sheet was collected for characterization. The die swell/expansion was so large, 25×, that the foamed sheet could not be rolled up. This extremely large die swell/expansion indicated that the branched PET/polycarbonate resin blend possessed a high melt strength. The density of the resulting foam sheet was reduced over the expected density using linear polyesters and the same amount of blowing agent and nucleant.

The foam sheet was examined under a microscope at a magnification of 100×. The cellular structure of the foam sheet was uniform, round, and closed, with a mean diameter of about 120 microns. Further characterization of the foam sheet made with the branched PET and polycarbonate revealed the following:

TABLE 1

| Test | Foamed PET with PC |
|---|---|
| IV | 1.16 |
| COOH | 5 |
| Density, g/cc | 0.31 |
| Thickness, inch | 0.5 |
| $T_m$, ° C. | 246.1 |
| Crystallization half time, T ½ sec | 41.3 |
| Percent crystallinity | 27.8 |

Example 2

The same procedure used in Example 1 was used in Example 2. The polycarbonate/RDN-1 pellet was made by adding MAKROLON® 1143 feed at 20 pounds per hour from the main T-20 feeder and RDN-1 from the K-2V auxiliary feeder at 24 pounds per hour and at a temperature profile of 260–280° C. with an extruder screw speed of 200 rpm. The resultant 1:1.2 PC/RDN-1 blend was pelletized and used in the next step.

Microcellular foam sheet was produced according to the same procedure as in Example 1. In this example, PET 1 was fed from the main feeder T-20 at a rate of 50 pounds per hour. For the control run, the auxiliary feeder K-2V delivered only the nucleant package RDN-1 at a rate to yield 1.2 weight percent RDN-1. The extruder temperature profile was set from 269–290° C., and the screw speed was set to 250 rpm. The control sheet was collected at 17 fpm and results of its characterization are shown below in Table 1.

In a second run, the branched polyester PET 1 was also fed at a rate of 50 pounds per hour, except that the auxiliary feeder K-2V delivered the 1:1.2 PC/RDN-1 pellets at a rate of 1.1 pounds per hour to achieve a 1 weight percent polycarbonate content and a 1.2 weight percent RDN-1 content.

In each of these runs, an annular die with 1.3 inch, 70° lips were used. Nitrogen gas blowing agent was injected in each run into the molten mixed polyester composition into the last ⅓ of the extruder at a gas rate of 0.1–0.5 SLM.

The effect of adding 1 percent polycarbonate to the branched PET was a noticeable increase in the polymer melt viscosity, which necessitated a 5 percent increase in a die opening at the extruder head to alleviate the pressure increase in the extruder. After the foam sheet was characterized, it's Dynatup impact strength was tested by thermoforming the sheet on a ZMD vacuum molding machine under the following conditions: sheet temperature was raised to 157° C., the mold temperature of 199° C. for 11 seconds, and the oven temperature was set at 102° C. for 5.6 seconds. The results are set forth in Table 2.

TABLE 2

| Material | IV | Density (g/cc), Free Rise | Thickness, mils | Impact, lb. at Ambient Temp. |
|---|---|---|---|---|
| PET 1 + 0 wt. % PC (Control) | 0.924 | 0.428 | 10 | 3.3 |
| PET 1 + 1 wt. % PC | 1.062 | 0.412 | 10 | 7.6 |

The results indicate that the impact strength of the thermoformed part made by adding as little as 1 weight percent of polycarbonate resin to a branched polyethylene terephthalate resin more than doubled over the same polyester resin made in the absence of the aromatic polycarbonate. The melt viscosity of the resin was also dramatically improved upon addition of 1 weight percent polycarbonate resin, so much so that the die opening had to be increased to alleviate the pressure increase in the extruder.

Example 3

In this example, the processing conditions of Example 2 were used, including the manufacture of the polycarbonate/RDN-1 blend at a 1:1.2 ratio, respectively, the preparation of the control, and the use of MAKROLON® 1143 linear polycarbonate resin. The difference in this example, however, was that PET 2 was used as the polyester resin. This polyester resin contained a lower amount of reacted polycondensation branching agent than PET 1, as well as a lower intrinsic viscosity.

In this example, the control, prepared without any polycarbonate resin, was very difficult to manufacture as a continuous foam sheet across the cooling can due to its marginal melt strength. The extrudate tended to tear across the cooling can at different intervals, rather than flow easily across the annular die to make a continuous foam sheet. The addition of 1 weight percent polycarbonate resin, however, had the same dramatic effect as in Example 2, and it became much easier to form and take up a continuous foam sheet. Samples from both sheets were characterized, and subsequently vacuum thermoformed as an Example 2 to test their impact strength. The results are set forth in Table 3.

TABLE 3

| Material | Thickness, mils | Density, g/cc, fr. | Impact lb. at Ambient |
|---|---|---|---|
| PET 2 + 0 wt. % PC (Control) | 17 | 0.369 | 6.8 |
| PET 2 + 1 wt. % PC | 16 | 0.372 | 8.6 |

The results again indicate an improvement in dynatup impact strength by employing an aromatic polycarbonate in an amount as little as 1 weight percent, compared to the same thermoformed polyester having no polycarbonate resin.

Example 4

In this example, pellets of polycarbonate/RDN-1 were prepared on the Leistritz extruder at a PC/RDN-1 ratio of 10:1.2. The polycarbonate feed was delivered at a rate of 30 pounds per hour on the main T-20 feeder and was combined in the extruder with the RDN-1 at a rate of 3.6 pounds per hour fed from the auxiliary K-2V feeder. The extruder temperature profile was set to 260–280° C. The material was pelletized and dried under vacuum at 90° C. for 16 hours before using it in the next step making a foam sheet.

The microcellular foam sheet was prepared as follows: dried PET 3, containing only 0.05 percent mole percent pentaerythritol and possessing an intrinsic viscosity of 0.95, was fed from the main feeder T-20 at a rate of 40 pounds per hour.

In the preparation of a control without the polycarbonate, where only 1.2 weight percent of RDN-1 was simultaneously fed from the auxiliary feed, it was impossible to make a continuous foam sheet using the extruder conditions described in Example 2. It was plainly evident that the polycondensed branched polyester resin alone did not possess sufficient melt strength to be pulled across an annular die without continually ripping and tearing. In a second run, the dried PET 3, also fed from the main feeder at 40 pounds per hour, was combined in the extruder with the PC/RDN-1 pellet blends delivered at a rate of 4.4 pounds per hour, to obtain a final polycarbonate loading of 10 percent. Unlike the control, the extrudate could be pulled across the annular die to form a continuous microcellular foam sheet. The sheet is characterized, and subsequently thermoformed as an Example 2 into a tray. The Dynatup impact of the thermoformed part was also tested. The results are reported in Table 3.

TABLE 4

| Material | Density, g/cc | Impact, lb. at Ambient |
|---|---|---|
| PET 3 + 0 wt. % PC (Control) | — | — |
| PET 3 + 10 wt. % PC | 0.50 | 5.6 |

This example shows that it is possible to use polycarbonate to enhance the properties of a marginally polycondensed branched PET having a low intrinsic viscosity, as well as prepare molded trays with acceptable properties. It is significant that in the absence of polycarbonate, no continuous foam sheet could be produced using a polyester having this low level of polycondensation branching agent. However, the addition of an aromatic polycarbonate significantly enhances the melt strength, even of polyester resins containing low levels of polycondensation branching agent.

Example 5

This example is illustrated to demonstrate that the combination of an aromatic polycarbonate with a linear PET cannot be used to succesfully extrude a continuous foam sheet. In this control example, the processing conditions of Example 2 were used. PET 5, a linear polyester, was used along with 1.0% of an aromatic polycarbonate and 1.2% of the RDN nucleant package. Nitrogen gas in the amount decribed in Example 2 was used.

The polyester composition could not be extruded across the annular die without ripping. Of the small segments of sheet that were made, the appearance of the sheet was open-cell, lace like, with a cheese cloth appearance having no mechanical properties and useless for any thermoformed application.

Example 6

In each of the runs in this example, a Leistritz Micro 27 extruder with 40L/D co-rotating screws was used to prepare a microcellular foam sheet. The polycarbonate resin and the RDN-1 nucleant package were not preblended and pelletized, but rather fed as individual streams, the polycarbonate resin through the K-2V auxiliary feeder and the RDN-1 nucleant package through the Conair auxiliary feed. The main feeder T-20 equipped with one screw delivered the polyester resin. A melt pump and an annular die with 1.3 inch, 70° lips were used.

The main feeder T-20 delivered PET 4 at a rate of 30 pounds per hour. The extruder pressure varied with the amount of PC added. The amount of nitrogen gas delivered ranged from 0.1–0.4 SLM. The extruder temperature profile was set from 215–300° C. The extrudate temperature was about 258° C. The sheet take up was set at a rate of about 5–7 fpm. The type of polycarbonate used is reported in Table 5. The rate of polycarbonate delivered was 0.45–0.9 pounds per hour. The rate of RDN-1 added to the package delivered was 0.36 pounds per hour.

A control made of PET 4 containing 1.2 weight percent of the RDN-1 nucleant package was prepared according to the conditions above. Because of the high degree of crosslinking present in PET 4, it was possible to make a foam sheet, however, the processing window was narrow and it was extremely difficult to yield a continuous thick foam sheet. After several attempts, the best and highest gauge sheet prepared from the control was selected for characterization and thermoforming into bundt pans of 55 mil thicknesses. The result is reported in Table 5 below.

PET 4 with 1.2 weight percent RDN-1 and the amount and type of polycarbonate resin specified in Table 5 was prepared according to the conditions specified above. In these runs, a high die swell was observed even at low amounts (less than 0.5 mole percent) of aromatic polycarbonate. All the modifications using the PC resins gave comparable to or, in most cases, thicker foam sheets. These foam sheets were also ZND vacuum thermoformed according to the conditions specified above. The results are reported in Table 5 below.

PET is that it has poor impact strength. By adding a small amount of polycarbonate resin to a polycondensed branched PET, all of these shortcomings have been overcome.

As noted in Example 5, linear PET cannot be extruded into a continuous foamed sheet. Even the addition of 1.0 wt. % of a polycarbonate to a linear PET, as noted in Example 5, was insufficient to enable the extrudate to process without ripping, and could not produce a closed cell polymer or a foam of any use. As observed in Example 4, using solely a lightly polycondensed branched (0.05 mole %) and a low IV (0.95) PET was insufficient to create a melt which extrudes well and consistently from an annular die, over a cooling can, and into a foamed sheet, due to its insufficient melt strength. As seen from the control in Example 6, increasing the amount of crosslinking, while sufficient to allow one to extrude continuous foam sheet with difficulty, could not produce a foam sheet of low density and a thermoformed article of high impact strength.

It was only upon combining a polycondensed branched polyester with an aromatic polycarbonate that a die swell, a continuous thick low density foam sheet, and a thermoformed article having high impact strength were experienced.

The results in Table 5 indicate that the addition of polycarbonate to a polyester composition containing polycondensed branched PET reduced the density of the foamed product by as much as about 30%, compared to the Control in which only the polycondensed branched PET was used. Due to the density reduction and increased melt strength, much thicker foamed sheets were made compared to the control. Accordingly, by adding polycarbonate to a polycondensed branched PET, less PET resin is needed to make a foamed sheet having the equivalent thickness as a foamed sheet made from a branched PET. Further, at an equivalent thickness, the density of the foamed sheet made with polycarbonate and a polycondensed branched PET is substantially reduced over a foamed sheet made simply from polycondensed branched PET.

The impact strength of the thermoformed sheets made with a polycondensed branched PET in combination with a polycarbonate, tested at both room temperature and at −20° C., was substantially improved over the thermoformed

TABLE 5

| | | DYNATUP IMPACT | | | | | | | | |
|---|---|---|---|---|---|---|---|---|---|---|
| | | ROOM TEMP | | | | −20° C. | | | | DENSITY |
| SAMPLE | PC | Max. Load lb. | Ratio L/D | Energy In – lb | Ratio E/D | Max. Load lb. | Ratio L/D | Energy In – lb | Ratio E/D | (g/cc), Free Rise | THICKNESS (mils) |
| CONTROL PET4 + 0.0% PC | Macrolon ® 3208 | 27.3 | 79.4 | 3.3 | 9.59 | 8.6 | 25 | 0.7 | 2.0 | 0.344 | 55 |
| PET4 + 0.32% PC | Macrolon ® 3208 | 31.9 | 116 | 4.1 | 15 | 7.8 | 28.4 | 0.6 | 2.2 | 0.274 | 55 |
| PET4 + 0.53% PC | Macrolon ® 3208 | 33.6 | 144 | 4.5 | 19.3 | 17.1 | 73 | 1.7 | 7.3 | 0.233 | 68 |
| PET4 + 0.75% PC | Macrolon ® 3208 | 43.8 | 178 | 5.9 | 24 | 16.4 | 66 | 1.3 | 5.3 | 0.246 | 70 |
| PET4 + 1.5% PC | Macrolon ® 3208 | 36.6 | 108 | 5.5 | 16.3 | 14.4 | 42.6 | 1.2 | 3.5 | 0.338 | 42 |
| PET4 + 0.32% PC (Branched PC) | Macrolon ® Ku11239 | 37.8 | 126 | 4.7 | 15.8 | 11.7 | 34.3 | 0.9 | 3.0 | 0.298 | 52 |
| PET4 + 0.53% PC | Macrolon ® Ku11239 | 32.6 | 93.1 | 4.2 | 12 | 14.4 | 41 | 1.2 | 3.4 | 0.351 | 64 |

PET has an inherently low melt strength, which contributes to poor foaming properties. Another shortcoming of sheets made with polycondensed branched PET in the absence of polycarbonate. As indicated in Table 5, the impact strength of thermoformed sheets at room temperature and at −20° C. made with polycondensed branched PET and both linear and branched polycarbonate are substantially improved over the Control polycondensed branched PET. Unexpectedly, the polycondensed branched PET/ polycarbonate thermoformed sheets had a better impact strength over the Control even though the PET polycarbonate thermoformed sheets had a lower density. And this improvement in impact strength was evident not only at lower densities, but also at equivalent sheet thicknesses of about 55 mils or thinner. Accordingly, foamed sheets can now be made at equivalent thicknesses with a simultaneous density reduction and improvement in impact strength.

The results in Table 5 also indicate a steady increase in impact strength through 0.75% polycarbonate followed by a tapering off and somewhat of a decline at a point between 0.75% and 1.5% polycarbonate, for polyester compositions having an intrinsic viscosity at 1.2. Nevertheless, the impact strength at 1.5% polycarbonate was significantly better than the physical properties of the Control. The density profile followed this same pattern.

The density of these runs was normalized by taking the ratio of impact strength at max load or its energy to the density. The results show a significant improvement in the impact strength of the polycondensed branched PET/ polycarbonate combination relative to a polycondensed branched PET without polycarbonate.

The results in Table 5 also indicate that the branched polycarbonate at a low loading of only 0.3% produced a thermoformed sheet having better impact strength than one made with a linear polycarbonate, both at room temperature and at −20° C. This suggests that at low loadings, a branched polycarbonate/polycondensed branched PET combination has the potential to provide better properties than the improvement realized with a linear polycarbonate/ polycondensed branched PET combination.

What we claim is:

1. A mixed polymer composition comprising:
   a) a semi-crystalline polyester composition in an amount of at least 90 wt. %, based on the weight of all polymers in the mixed polymer composition, said polyester composition consisting of polyester polymers, said polyester polymers comprising polycondensed branched polyester polymers, and
   b) non-halogenated aromatic polycarbonate polymers in an amount of from 0.01 wt. % to 10.0 wt. %, based on the weight of the mixed polymer composition.

2. The mixed polymer composition of claim 1, wherein the polycondensed branched polyester polymer comprises a reaction product of 0.01 to 5.0 mole % of a polycondensation branching agent based on the total moles of polyester polymer monomers.

3. The mixed polymer composition of claim 2, wherein the polycondensed branched polyester polymer comprises the reaction product of 0.01 to 1.0 mole percent of a polycondensation branching agent based on the total moles of polyester polymer monomers.

4. The mixed polymer composition of claim 3, wherein the polycondensation branching agent has an average nominal functionality of greater than 2.

5. The mixed polymer composition of claim 4, wherein the polycondensation branching agent comprises trimethylolpropane, trimethylolethane, pentaerythritol, glycerine, sucrose, or mixtures thereof.

6. The mixed polymer composition of claim 4, wherein said polycondensation branching agent comprises trimesic acid, trimellitic acid, benzophenone tetracarboyxlic acid, pyromellitic acid, citric acid, the anydrides of salts thereof, or mixtures thereof.

7. The mixed polymer composition of claim 4, wherein said polycondensed branched polyester polymer comprises an aromatic polycondensed branched polyester polymer.

8. The mixed polymer composition of claim 4, wherein the polycondensed branched polyester polymer possesses an IV of 0.65 to 1.75 g/cc.

9. The mixed polymer composition of claim 8, wherein the polycondensed branched polyester polymer possesses and IV of 0.95 to 1.5 g/cc.

10. The mixed polymer composition of claim 1, wherein the amount of polycarbonate ranges from 0.05 wt. % to 2.0 wt. %, based on the weight of the mixed polymer composition composition, and the polyester composition is semi-crystalline at 25° C. and 1 atmosphere.

11. The mixed polymer composition of claim 10, wherein the amount of polycarbonate ranges form 0.1 wt. % to 1.5 wt. %, based on the weight of the mixed polymer composition.

12. The mixed polymer composition of claim 11, wherein the amount of polycarbonate ranges 0.2 to 1.0 wt. %. based on the weight of the mixed polymer composition.

13. The mixed polymer composition of claim 1, wherein the aromatic polycarbonate comprises a linear aromatic polycarbonate.

14. The mixed polymer composition of claim 13, wherein the aromatic polycarbonate is derived from Bisphenol A.

15. The mixed polymer composition of claim 1, wherein the aromatic polycarbonate is represented by the structure:

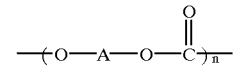

wherein A is a multivalent aromatic radical derived from the polyhydric phenol used in the preparation of the polymer, and n represents the number of repeat carbonate units.

16. The mixed polymer composition of claim 15, wherein A is derived from a polynuclear aromatic compound comprising two or more hydroxy radicals, each directly bonded to a carbon atom of the aromatic nucleus.

17. The mixed polymer composition of claim 1, wherein the aromatic polycarbonate comprises a branched aromatic polycarbonate.

18. The mixed polymer composition of claim 17, wherein the amount of branched aromatic polycarbonate is at least 0.2 wt. % based on the weight of the mixed polymer composition.

19. The mixed polymer composition of claim 18, wherein the branching on said branched aromatic polycarbonate is a $C_2$–$C_{10}$ alkyl, $C_5$–$C_{15}$ cycloalkyl, or a $C_6$–$C_{20}$ aryl, aralkyl, or alkaryl aromatic branch.

20. The mixed polymer composition of claim 1, wherein said polycondensed branched polyester polymer is semi-crystalline at 25° C. and 1 atmosphere.

21. The mixed polymer composition of claim 1, wherein the polymer composition comprises an aromatic polycarbonate in an amount of from 0.2 wt. % to 1 wt. %, based on the weight of the composition.

22. The mixed polymer composition of claim 1, further comprising a nucleating agent and optionally a filler, colorant, reinforcing agent, and/or an antioxidant.

23. The mixed polymer composition of claim 22, wherein said nucleating agent comprises a polyolefin, a polyethylene polymer, a polyhaloethylene polymer, or mixtures thereof.

24. The mixed polymer composition of claim 15, wherein said polyhydric phenol comprises: 2,2-bis-(4-hydroxyphenyl)propane; 2,2-bis(3,5-dibromo-4-hydroxyphenyl) propane; 2,2-bis(3,5dichloro-4-hydroxyphenyl)propane; hydroquinone; resorcinol; 2,2-bis(4-hydroxyphenyl)pentane; 2,4'-(dihydroxy diphenyl) methane; bis(2-hydroxyphenyl)methane; bis-(4-hydroxyphenyl)methane; 1,1-bis-(4-hydroxyphenyl)ethane; 3,3-bis(4-hydroxyphenyl)pentane; 2,6-dihydroxy naphthalene; bis-(4-hydroxydiphenyl)sulfone; bis-(3,5-diethyl-4-hydroxyphenyl)sulfone; 2,2-bis-(3,5-dimethy-4-hydroxyphenyl)propane; 2,4'-dihydroxyphenyl sulfone; 5'-chloro-2,4'-dihydroxydiphenyl sulfone; bis-(4-hydroxyphenyl) diphenyl sulfone; 4,4'-dihydroxydiphenyl ether; 4,4'-dihydroxy-3,3-dichlorodiphenyl ether; or 4,4'-dihydroxy-2,5-dihydroxy diphenyl ether.

* * * * *